Dec. 19, 1961 M. E. CUPERY ET AL 3,013,897
SILICA COATING COMPOSITION, PROCESS OF COATING
METAL THEREWITH AND ARTICLE
PRODUCED THEREBY
Filed March 20, 1959

INVENTORS
MARTIN E. CUPERY
RALPH K. ILER

BY Fred C. Carlson
ATTORNEY

United States Patent Office 3,013,897
Patented Dec. 19, 1961

3,013,897
SILICA COATING COMPOSITION, PROCESS OF COATING METAL THEREWITH AND ARTICLE PRODUCED THEREBY
Martin E. Cupery and Ralph K. Iler, Brandywine Hundred, Del., assignors to E. I. du Pont de Nemours and Company, Wilmington, Del., a corporation of Delaware
Filed Mar. 20, 1959, Ser. No. 800,893
11 Claims. (Cl. 117—46)

This invention relates to compositions and processes for coating metals and to the coated metals produced, and is more particularly directed to such coating compositions comprising aqueous dispersions in which there is (a) a dispersed organic film-former which is a carboxylic, polyanionic polymer containing a sufficient proportion of carboxyl groups that the ammonia salt of the polymer is at least 1% by weight soluble in water at 25° C. and pH 6.5, the polymer being removable without carbonization by heating at a temperature below 700° F. and being one which dries to a solid, and (b) colloidally dispersed, non-reticulated silica particles having an average size of 3 to 150 millimicrons, the concentration of silica in the aqueous dispersion being from 1 to 50% by weight, the total solids content of the coating composition being up to 70% by weight, and the initial proportion of removable film-former being from 5 to 100% by weight, based on the weight of silica; is further directed to processes comprising the steps of coating a metal with a said composition, drying the coating, and heating the coating at a temperature above that at which at least part of the film-former is removed but below the melting point of the metal; and is further particularly directed to coated metals produced by said processes, the metal having a melting point above 400° F. and being stable against complete oxidation in air up to at least about 400° F., said metal having upon its surface a coalesced, continuous coating of silica particles, the particles having an average size of 3 to 150 millimicrons and the coating being strongly adherent to the metal.

Figure 1:
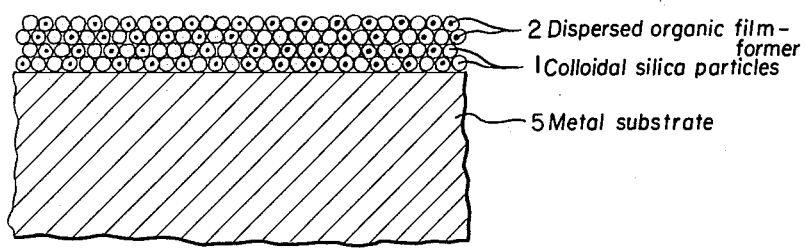
Figure 2:
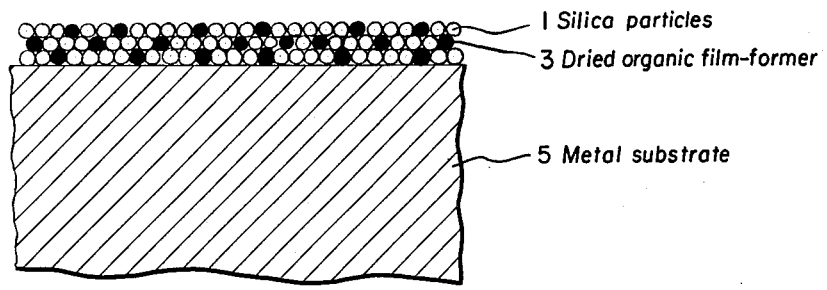
Figure 3:
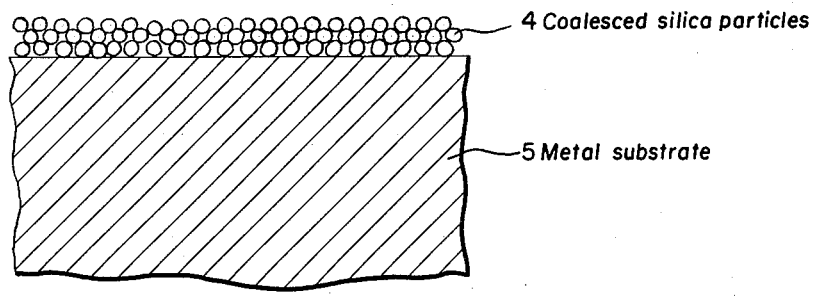

In the drawing, FIGURE 1 represents a metal substrate 5 to which there has been applied a coating comprising a dispersed organic film-former 2 and silica in the form of colloidally dispersed, not-reticulated particles 1, the coating being as applied from an aqueous dispersion. Figure 2 represents the metal substrate 5 having a coating comprising the silica particles 1 and dried, dispersed organic film-former particles 3, the coating being as it is present after drying. FIGURE 3 represents the metal substrate 5 having a coating of coalesced silica particles 4, the coating being as it is present after removal of the film-former. It will be understood that the drawings are representative only, the silica particles being of sub-microscopic size and hence not capable of direct graphic portrayal.

Various attempts have been made heretofore to produce adherent films or coatings of metal oxides upon metals, but such efforts have been successful only when a vehicle of some kind is permanently present to bind the particles to the metal, as in the case of paints, or when the film is of infinitesimal thickness or consists of an oxidized layer of the metal itself rather than of particles which are substantially discrete and in approximately the colloidal size range. Where the purpose has been to form metal oxide films on the metal by applying an aqueous dispersion of metal oxide particles substantially of colloidal size (1 to about 150 millimicrons) and drying, the films obtained have generally been of poor quality, badly crazed, lacking in adherence, and of irregular or discontinuous character.

Metal oxide dispersion coating compositions which it has heretofore been attempted to use are, at neutral pH, very viscous and hence difficult to apply. The viscosity of such prior-art coating compositions has also been found not constant under the varying conditions of pH and concentration encountered in use. This causes considerable difficulty in commercial application of the coating agents.

Furthermore, to achieve stable viscosity with the prior-art coating agents the pH has to be raised quite high—high enough to cause evolution of hydrogen if the coating agents are applied to aluminum. Similar attack occurs on magnesium and on such amphoteric metals as zinc.

When mixtures of organic film-formers and metal oxide powders, in which the particles are of microscopic size, have been applied to metals, the coatings obtained have been rough and irregular and have had very low adhesion. This was evidenced by the fact that they could be removed by scrubbing them with soap and water.

Now according to the present invention it has been found that these and other deficiencies of prior-art coatings of metal oxides on metals can be overcome, and strongly adherent, non-crazed, hard, abrasion-resistant coatings of coalesced silica particles in the size range of 3 to 150 millimicrons can be produced by applying the silica to the metal as a coating of an aqueous colloidal dispersion thereof containing also dispersed particles of an organic film-former, drying the coating, as by evaporating off the water, and heating the coating to a temperature sufficiently high to remove at least part of the film-former, either by burning it off or volatilizing it, or both, whereby coalescence of the silica particles occurs and a silica coating of the type desired is obtained. The coating compositions employed are fluid and easy to handle, have a constant viscosity under conditions of use, and can be applied at neutral or slightly acidic pH, whereby the metal etching problem above noted is circumvented.

The silica selected for use in a composition of this invention is preferably amorphous. Crystalline silica or silicates, for instance, are difficult to coalesce under the heating conditions involved and hence are less desirable to use than amorphous silica.

The silica is used in the form of a colloidal dispersion in an aqueous system, the individual discrete particles in this dispersion being in the size range of from 3 to 150 millimicrons. Thermal processes for producing such finely divided silica are well known. For instance, the product known as "K-3" has been made in Germany by mixing hydrogen with air saturated with silicon tetrachloride, burning the mixture under a rotary drum, and collecting the silica. Examples of other thermal processes for making finely divided silica are found in Reik U.S. Patent 2,428,178 and in Broughton U.S. Patent 2,535,036. Products of these processes can be dispersed in aqueous systems for use in the present invention, if necessary by adjustment of the pH by adding alkali.

While colloidal dispersions of silica in which the particles slowly settle out upon standing can be used, it is especially preferred to employ colloidal aquasols in which the particles remain permanently suspended.

The silica particles preferably should be of the non-reticulated or non-aggregated type, and if any aggregation is present, it should be so loose that the aggregated particles are readily broken down by milling. Silica sols in which the particles have a strong tendency to aggregate, gel quite readily, and it is preferred in the present invention to use sols which can be concentrated at least to 20% by weight of silica without gelling or solidifying.

Suitable silica sols can be prepared by a variety of methods with which the art is already familiar. For instance, there may be used sols as prepared in the White United States Patent 2,375,738. These are not preferred because the particles tend to be not discrete but aggregated into clusters. They nevertheless will give some benefit in unusual circumstances and where whitening is not objectionable. The sols of the Bird United States Patent 2,244,325 and Voorhees U.S. Patent 2,457,971 can also be used with suitable modification. Generally these sols as prepared by ion exchange have an average particle size below 3 millimicrons and hence are below the desired size range, but the particles may be grown to within the operable range by heating them. Also, these sols, as prepared, have a tendency to coalesce more than is desired.

Silica sols more effective than those just mentioned can be prepared according to processes shown in Bechtold and Snyder United States Patent 2,574,902. The sols of this patent have uniform, discrete, spherical particles about 15 to 150 millimicrons in average diameter. Sols produced as shown which have particles up to about 20 millimicrons are suitable for use according to processes of the present invention. Similarly suitable are the sols of the Rule United States Patents 2,577,484 and 2,577,485. These sols are composed of discrete silica particles in the diameter range of about 10 to 150 millimicrons; of these, one may use to especial advantage sols in which the particle size ranges from 10 to 20 millimicrons.

Among the most preferred sols for use according to the present invention are silica sols in which the particle size range is from 5 to 20 millimicrons and which are otherwise like the sols of the Bechtold and Snyder and Rule patents. Such sols can be prepared by processes described in United States Patent 2,750,345 issued June 12, 1956, to Guy B. Alexander.

It is customary in the art to employ small amounts of stabilizers in silica sols. In the preferred sols above-mentioned alkalis, such as sodium hydroxide, are used as stabilizers. It is preferred to confine the amount of such stabilizers to a minimum, except that when the stabilizer is a volatile base, such as ammonia or an amine, or a volatile acid, such as acetic or formic acid, larger amounts may be used because they will be removed by the heating step in the process. The choice of stabilizer will be dictated to some extent by the corrodibility of the base metal upon which the coating is to be produced. When the coating is intended to have electrical insulation properties, for example in the case of wire coatings, it is preferred to use sols of low ion content so that the electrical conductivity is held to a minimum.

The concentration of the silica in the coating composition as it is applied to the metal substrate, can be in the range of 1 to 50% by weight and preferably is in the range of 3 to 8%. In a preferred aspect the coating composition will be an aquasol containing dense silica particles, the relationship of the concentration and surface area of the silica particles being such that the silica surface area is up to 100,000 square meters per liter of sol.

The film-former employed in a composition of this invention must be dispersed in the medium in which the silica is dispersed. Thus, if water is the continuous phase of the silica sol, the film-former must be water dispersible, at least in part. If the film-former is water soluble, or colloidally dispersible it is, of course, water dispersible.

The film-former is a carboxylic, polyanionic polymer containing a sufficient proportion of carboxyl groups that the ammonia salt of the polymer is soluble to the extent of at least 1% by weight at 25° C. and pH 6.5.

The film-former must be heat removable, so that at temperatures below 700° F. it can be either volatilized or burned off without carbonization from the coating after the coating is applied to the metal. On heating it should decompose in such manner that the residues are not mainly amorphous carbon. For example, cellulose, sugars, and their derivatives tend to decompose on heating at 450 to 600° F. in such manner that free carbon is formed which oxidizes only slowly without producing optimum sintering. Polymers which depolymerize cleanly and readily at 400 to 700° F. are especially useful in the operation of this invention.

The organic film-former should preferably also be a material which is capable of gelation as the aqueous sol is concentrated by evaporation, and in any event must be one which dries finally to form a solid. The term "solid" is here used to distinguish over materials which remain in a liquid state—that is, the film-former is not to be confused with a high-boiling organic liquid.

The film-former preferably is hydrophilic and either soluble or self-dispersible in water at some point within the pH range of 3 to 10.5, and at a concentration of 1% gives an essentially clear solution. If it is soluble, it goes through the stage of being colloidally dispersed upon drying of the coating mixture. The film-former should be compatible with the silica dispersion in that the mixture does not gel or precipitate for a period of at least one-half hour after mixing. To be compatible the particle charge of the dispersed polymer and the colloidal silica should not be opposite in character.

The preferred polymeric film-formers are those that at 5% by weight concentration in water have a viscosity of 4 centipoises at pH 3.5 and have a viscosity greater than 1000 centipoises at pH 8.0. These are preferred because they result in compositions of greater homogeneity which are more stable after the pH is raised above neutral.

It is especially preferred that the polymer film-former be hydrophilic, so that when it dries, it will yield films which give up the water slowly, and therefore remain smooth and continuous. Some polymers which are more hydrophobic in nature, tend to be precipitated during the last stages of drying, giving poor, non-coherent films. Hydrophilic polymers are often characterized by containing some polar groups in addition to the carboxylic acid groups which are responsible for their solubility in water as the ammonium salt. Such hydrophilic groups are usually highly hydrated and are probably responsible for the fact that the films retain moisture evenly during drying, and therefore form homogeneous films in the hydrated state, rather than dehydrated crumbs, as the water is removed. Polar groups which make polymers hydrophilic are hydroxyl, amide, methoxy, alkoxyl, hydroxy alkoxy, keto groups, and carboxylic acid ester groups of the lower alcohols, particularly methyl and ethyl. It will be noted that among the polymers mentioned below, polar groups are included, for example, in the methyl vinyl ether, the polyvinyl acetate, and the cellulose components of the polymers named. The styrene/maleic anhydride polymer does not contain hydrophilizing groups other than the carboxyl groups, and this polymer does not yield as viable films as some of the others. Nevertheless, when employed in low concentrations, it has beneficial effects, particularly with sols having silica particles which are relatively large.

In general, the film-former polymers should have high molecular weight, that is, of sufficient molecular chain length to have good film-forming properties. Polymers having molecular weights less than about 10,000 are often brittle and have poor adhesive strength. On the other hand, polymers having a molecular weight of 50,000 or higher are most useful in the present invention.

It should also be noted that, in general, polymers which are too highly cross-linked will not swell or dissolve when the pH of the disepersion is raised and will therefore not give satisfactory coatings.

The organic film-former employed in processes of this invention may vary in chemical composition while retaining its hydrophilic and colloidal character. Thus, among the polymers which are particularly suitable are vinyl polyanionic polymers containing carboxyl groups in sufficient number to solubilize the polymer upon neutralization with alkali, ammonia or amines.

Other examples of water-soluble organic polymers in the form of their ammonium salts which may be employed in this invention are locust bean gum and styrene/maleic anhydride copolymer of high molecular weight. Carboxymethyl cellulose in the form of its ammonium salt is another example. Polymers containing amic acid structures are included, such as styrene/maleamic acid copolymers.

Specific polymers of the above types which are especially effective include polyvinyl acetate copolymers and acrylic acid-methyl methacrylate coploymers.

A specifically preferred film-former is a cross-linked emulsion copolymer of acrylic acid and methyl acrylate sold by Rohm and Haas Company under the trade name "Acrysol ASE-60," and having the following properties:

Percent solids_____ 28±0.5%.
pH when shipped_____ 3.5.
Viscosity as shipped_____ 4.0 cp.
Viscosity of aqueous solution of
  5% ammonium salt (pH 8.0)___ 25,000 cp. (approx.).
Viscosity of aqueous solution of
  1% ammonium salt (pH 8.6)___ 3,000 cp. (approx.).

The proportion of organic film-former in the coating composition should be from 5 to 100% by weight, based on the weight of the silica. Particularly good results are obtained with compositions in which the film-former is present in the proportion of from 15 to 30% by weight based on the weight of silica. It will be understood that the proportions are adjusted, within the range specified, to take account of the particular silica being used and the type of coating desired upon the metal.

In general, the amount of "Acrysol" required to prevent crazing of the silica film upon drying, depends upon the particle size of the silica. Thus, for 7 millimicron particles, one should employ about at least 35% by weight of polymer, based on $SiO_2$. On the other hand, for 15 millimicron diameter particles, around 10% is the minimum amount of polymer that should be employed, based on the weight of $SiO_2$. For still larger particles, even lesser quantities of polymer, based on the weight of silica, are required, although in most cases, at least 5% by weight of polymer, based on silica, is needed to give appreciable improvement in film-forming properties.

Generally speaking, up to 100% by weight of polymer may be employed in all cases, based on the weight of silica. These give strong and adherent air-dried coatings, which will still yield coherent silica coatings after the organic material is burned out. If much more organic polymer than this is used, in proportion to the weight of silica, then the silica coatings remaining after oxidation of the organic portion, are weaker and more porous.

The total solids content of the coating composition is up to 70% by weight, and preferably is from 0.1% to 40%.

One specifically preferred embodiment of the coating compositions of this invention is a concentrated mixture of colloidal silica, containing at least 15% $SiO_2$, and dispersed carboxylic acid vinyl polymer in the form of solid particles, the mixture having a pH below 7 so as to maintain the polymer particles in the unswollen, undissolved state. This mixture can be stored and shipped, and can be diluted and alkalized by the ultimate user to make the final coating composition.

Another specifically preferred embodiment is in the use of salts of non-metal bases and carboxylic acid polymers in the form of the ammonium salt as thickening agents and film-formers in combination with colloidal silica in relatively dilute solutions, such as 5% $SiO_2$, for the application of coatings to metals.

Any alkali metal hydroxide or organic base can be used to adjust the pH of the coating compositions. Organic bases are preferred, and ammonia is especially preferred.

Preferred concentrated compositions of this invention are the concentrated mixtures of colloidal silica and a dispersion of unswollen polyanionic polymer film-former particles, the total solids content of the composition being up to 70% by weight, the amount of organic polymer being from 5 to 100% based on the silica present, and the preferred compositions containing from 10 to 40% total solids. Even more concentrated compositions up to 50% total solids may be prepared, providing the ratio of organic polymer to silica is in the lower end of the above range.

This maximum concentration is, of course, also limited, depending on the particle size of the colloidal silica. For example, with silica particles only 15 millimicrons in diameter, silica concentrations higher than about 35% by weight are not as stable in storage as when the particles are larger, i.e., anywhere up to 100 or 150 millimicrons in diameter. Then the concentration in an aqueous silica sol can range up to 60% in temporarily stable compositions which can be diluted back with polymer film-former dispersions to give a relatively concentrated commodity comprising colloidal silica and organic polymeric film-former particles.

Various adjuvants, while not essential, can often be used to considerable advantage in the compositions of this invention. Thus, there can be included surfactants, wetting agents, alcohols and the like for the purpose of aiding the wetting of the metal surfaces to which the compositions are to be applied. These can also be included viscosity control agents, for the purpose of making a mixture which can be most easily applied to the metal from the standpoint of working characteristics. There can also be used evaporation control agents to regulate the rate at which volatile constituents are removed from the mixture. Agents, such as hydrazine, thiourea, and commercially available antioxidants and corrosion inhibitors, can also be added to the compositions to minimize the tendency of the water to corrode the metal surfaces, such as steel. In general, it is desirable to select agents which, similar to the film-former, are removable by volatilization or oxidation. When it is desired that the final coatings have good electrical insulation properties, the agents selected preferably will have a low inorganic content.

All of the above-mentioned agents are conventional additions to aid in the application of liquids to surfaces for the purpose of forming films thereon and those skilled in the art will have no difficulty selecting particular agents as adjuvants to accomplish these and other purposes.

The above-described coating compositions can be advantageously used for forming adherent films on a wide variety of materials such as paper, wood, plaster, stone, plastics, and the like. However, they are especially effective for forming coatings upon metals, and this use will now be described.

The metal upon which coatings are formed according to processes of this invention can, with certain exceptions, be any metal which it is desired to protect. Since the coating compositions are applied as aqueous dispersions, the metal obviously must be stable in the presence of water and hence sodium, potassium, or calcium are not suitable as the substrate metal. Also, the metal must not melt or substantially oxidize at temperatures below that at which the film-former is heat removable, that is, at less than 400° F. For this reason mercury, bismuth and many of its alloys, lead, and magnesium, for example, are not suitable substrate metals. On the other hand, the compositions and processes are especially well adapted for the coating of such metals as iron of various grades and qualities including steels, copper, aluminum, silver, zirconium, and alloys made from these metals, such as aluminum alloys, bronzes, and stainless steels, to form coatings which are both decorative and protective, or which may serve as base coats for the application of top coats to give decorative, protective and insulating effects.

The metal can be in any physical form and thus can be in the form of sheets, plates, wire, woven wire screens, granular, powder, or in any other physical form.

In the coating processes of this invention the first step is to prepare the silica film-former composition as already described above. The metal surface is also suitably prepared, according to conventional methods, as for instance, by solvent cleaning to remove oily dirt, acid pickling to remove rust and corrosion, and alkali cleaning to remove scale or various types of surface contaminants.

The silica film-former composition is then applied to the metal by dipping, spraying, transferring from a transfer roll, rubbing on, painting on, or applying in any other manner adapted to obtain uniform distribution on the surface of the metal. The metal may be pre-heated but should not be so hot as to cause too violent evaporation of the liquid carrier as the coating composition is applied. In one preferred embodiment of the invention the coating composition can be applied to the metal and the polymer then swollen in situ by subjecting the still-wet coating to contact with ammonia gas.

The next step is to dry the coating by evaporating off the water present in the coating composition. This can readily be done by conventional methods such as air drying at ordinary temperatures or by drying in a hot-air furnace, induction heating, and the like. The dried coating is next subjected to high temperature heating—that is, to heating above the removal temperature of the film-former present. The specific temperature required will depend, of course, upon the film-former which it is desired to remove. If the film-former is one which is volatile at elevated temperatures, it is preferable to employ a temperature only somewhat above the volatilization temperature. On the other hand, if the film-former must be burned out, higher temperature must be employed and an oxygen-containing gas must be present. In any event the temperature used is well below the melting point of the metal being coated. For metals like copper, aluminum, and steel it is preferred to use a film-former which can be completely removed by heating to temperatures from 400 to 900° F., preferably 400 to 500° F.

The heating at this point of the process accomplishes the dual function of removing the organic film-former and coalescing the metal oxide particles. It will be understood, of course, that if the colloidally dispersed film-former is removed at a temperature below that at which coalescence occurs, the heating must be continued at an elevated temperature until coalescence has occurred.

The amount of coating applied according to a process of this invention is such that after coalescence of the particles the silica coating has a thickness less than about 0.5 mil and preferably, about 0.1 mil. Additional layers of the coating may be applied, however, to give a coherent silica coating which after coalescence, may have up to one or two mils thickness.

The coated metal articles of this invention have a substrate of a metal such as steel, aluminum or copper which is surface-coated with a coating of coalesced, amorphous silica particles. The fact that the silica particles are coalesced means that they are joined together, but their coherence in the form of coalescence is not greater than their adherence to the base metal, so that they adhere to the base metal and do not strip off as a sheet of coalesced particles. To the extent that the original silica particles are still distinguishable, these particles are substantially in the size range from 3 to 150 millimicrons in diameter.

The coating is so strongly adherent to the basic metal that when a masking tape is firmly applied thereto and then pulled off, the silica remains adherent to the base metal. The metal can also be flexed, rolled and drawn, or otherwise worked, without extensive separation of the coatings from the metal.

Because of their unique properties the coated metals of this invention have a wide range of valuable utility. They can serve as substrates for surface coatings such as hard or refractory surfaces, as, for example, titanium carbide. They can serve as absorbent coatings for organic dyes to give decorative and design effects and to improve the absorption of printing inks and dyes. They provide a better surface for bonding to adhesives, and finishes, and can thus serve as base coats replacing a part of conventional primer coats. They absorb metal ions and hence can serve as supported catalysts both with and without the addition of metal ions such as silver, copper, cobalt, chromium, palladium and nickel. When the base metal is in the form of wire the coatings are especially useful as insulators, particularly in connection with high-frequency electric currents. The coatings serve as lubricants for the metals at very high temperatures, and at lower temperaures are bases for extreme pressure lubricants.

The coatings provide a measure of corrosion resistance and this can in some cases be enhanced by rolling the coating into the metal under extreme pressure rolls. For example, a coating of the silica particles can be laid down upon steel and the steel then submitted to mechanical action as in hot or cold rolling operations. In this manner the surface of the steel is impregnated with the silica and the steel acquires improved resistance to corrosion.

The invention will be better understood by reference to the following illustrative examples, in which all parts are by weight unless otherwise specified.

*Example 1*

To 11 parts of an acidic (pH 3.5) aqueous copolymer dispersion containing about 28% copolymer solids, the copolymer containing about 33% acrylic acid and 67% methacrylate, was added 200 parts of water and 62 parts of "Ludox" HS silica aquasol. After mixing the composition was further diluted with 96 parts of water and then neutralized by the gradual addition with mixing of 0.9 part of concentrated ammonium hydroxide. The final composition was slightly alkaline and contained 0.83% of copolymer and 5% silica calculated at $SiO_2$.

The above composition could be flowed or sprayed as thin coatings onto 12-gauge steel, copper, and aluminum test plates. Upon evaporation at temperatures up to 100° C., clear and continuous coatings of the composition were obtained. When the test panels were heated at a temperature of 400 to 600° F. for periods of five to fifteen minutes, the carbon content of the film was 60% removed, thereby leaving a strongly adherent, colorless, microporous, glass-like, coalesced silica coating on the test panel.

Repeated applications by the above procedures gave uniform coatings of increased thickness. These coatings had high adhesion to the metal substrates, had high electrical resistivity and were highly resistant to scrubbing with soap water.

An increase in the proportion of the copolymer to 20 to 40% based on silica in the above composition gave the films a reduced tendency to craze and crack upon drying, so that continuous films of somewhat greater thickness could be obtained with single applications of the composition. However, within the proportion range of 100 to 400% copolymer based on silica no additional advantages in the continuity of the films obtained from such compositions were noted. Moreover, at the higher polymer concentration levels of about 200 to 400% the polymer component generally became increasingly difficult to remove satisfactorily by heating, and comparatively fragile silica coatings with low adhesion to the substrate were obtained. In general, for the production of continuous adherent silica coatings it appeared impractical to use compositions containing less than about 5% or more than about 100% by weight of the above copolymer based on silica.

Example 2

To 10 parts of the acrylic acid/methylacrylate copolymer dispersion containing 28% copolymer by weight described in Example 1 above, was added 300 parts of water and 94 parts of the "Ludox" HS silica aquasol (30.1% $SiO_2$). After mixing the composition there was added, with agitation, 156 parts dilute ammonium hydroxide solution containing 0.14% $NH_3$, to form the ammonium salt of the acrylic acid, which upon subsequent heating goes to an amide structure. The final composition was faintly alkaline and contained about 0.5% copolymer and 5.0% silica as $SiO_2$.

This composition was applied to 12-gauge, 4-inch by 6-inch panels of steel, copper, and aluminum, using the procedures described in the foregoing examples. The heating step at 400° F. for ten minutes gave essentially complete oxidation of the organic components in the film without carbonization and produced continuous adherent coatings of silica on these substrates.

A 2-inch width strip of adhesive tape about 4-inch length was applied to the silica-coated test panels described above and also to corresponding untreated control panels. After conditioning at 72° F. and 50% relative humidity, the force which was required to withdraw the tape from the panel surface in a direction essentially perpendicular to the panels was measured with a tensile testing machine, using a pull rate of 10 inches per minute. The adhesion of the adhesive tape was much higher to the silica-coated panel than it was to the untreated metal surfaces as is indicated by the values tabulated below. In these tests the silica coatings were not removed from the metal surface by the adhesive tape and the adhesive force of the coatings was often greater than the cohesive force of the rubber adhesive composition on the adhesive tape.

| Test panel type: | Mean adhesive force in lbs. |
|---|---|
| Silica-coated steel panel | 3.1 |
| Untreated, sanded control steel panel | 2.7 |
| Silica-coated aluminum panels | 3.1 to 4.5 |
| Untreated, smooth aluminum panels | 2.3 to 2.5 |
| Untreated, sanded aluminum panel | 2.5 to 2.7 |
| Silica-coated copper panel | 3.4 |
| Untreated, sanded copper panel | 2.6 |

The above-described acrylate copolymer/dispersed silica composition was applied to 22-gauge, single-strand copper wire and to a stranded wire made of 7 strands of 36-gauge, 4% silver-coated copper wire to give uniform coatings having high adhesion. These coatings were especially useful as primer coatings for the application of tetrafluoroethylene aquasols, and such aquasols blended with silica sols, as described in U.S. Patent 2,592,147. The coated wires had high electrical resistivity and a high dielectric constant. The coatings also showed greatly improved adhesion. These silica primer coatings have an important advantage over organic primer coatings in that they are resistant to high temperature exposures, for example, as in magnet wire applications.

Example 3

Silica coatings on about 0.1 to 0.5 mil thickness applied to 8-gauge, mild steel plates by the procedures of Example 2 had high adhesion and glass-like appearance. These test plates were passed under high pressure through hard steel rolls spaced in such a manner that the plates were rolled to a gradually diminished thickness. After five or more passes through the rolls the plates showed about 10% decrease in thickness. No appreciable flaking of the silica coating was noted during the cold-rolling process. A subsequent application of methylene blue dye solution to the panel gave a characteristic blue color, indicating that the silica particles had become imbedded into the surface of the steel panels.

Temperatures of 200° C. and higher facilitate the rolling process. Repeated coatings of silica could be applied alternately with the cold-rolling procedures. In this manner, steel sheets having a uniformly impregnated silica surface were obtainable. These showed superior adhesion to paint finishes and improved resistance to corrosion, compared to unmodified steel surfaces.

Example 4

Thirty parts by weight of "Ludox" colloidal silica, containing 30.2% $SiO_2$ in the form of particles having an average diameter of around 15 millimicrons, and alkali equivalent to 0.32% $Na_2O$, was neutralized with 0.2 part by weight of glacial acetic acid. To this was then added 2 parts by weight of "Acrysol" ASE–75 which is an aqueous dispersion containing 40% by weight of polymer solids and having a pH of 3.0, diluted with 28 parts by weight of water. The resulting concentrated composition, having a pH of 4, contained about 15% by weight of colloidal silica, and 1.33% by weight of the polymer. It was a white, milky fluid, which was stable for some time, although it showed a slight increase in viscosity after aging for a number of days. When diluted with water so that the silica concentration was reduced to 5%, and rendered alkaline to about pH 9 with concentrated ammonium hydroxide, a viscous liquid was obtained suitable for preparing silica coatings. When the pH was raised, the acidic polymer originally present in the form of solid particles, swelled and passed into solution, greatly increasing the viscosity.

Example 5

Thirty parts by weight of colloidal silica, having a particle diameter of 50 millimicrons and containing 35% by weight of $SiO_2$, stabilized with a small amount of alkali, was neutralized to about pH 4.5 with glacial acetic acid, and then mixed with 5 parts by weight of "Acrysol" ASE–75, which had previously been diluted with 10 parts by weight of water. The composition was then adjusted to a pH of 6.4, and yielded a relatively stable concentrated commodity, which could later be diluted and rendered alkaline, to provide a thickened colloidal silica coating composition.

Example 6

The product of Example 5 was concentrated by evaporation of water under vacuum, until the total solids content of silica and organic polymer was 50% by weight. A viscous, white dispersion was thus obtained, which was more economical for packaging and shipping. This concentrated product contains 42% by weight of $SiO_2$ and 8% by weight of organic polymer.

Example 7

This is an example of a composition of this invention made with colloidal silica having a particle size of about 7 millimicrons in diameter. Sixty parts by weight of "Ludox" SM, a commodity containing 15% by weight of $SiO_2$ in the form of 7 millimicrons diameter colloidal silica particles, and stabilized with a small amount of alkali, was neutralized with acetic acid to a pH of 4 by rapid addition, with strong agitation, of glacial acetic acid, so as to pass through the unstable range of about 5.5 as rapidly as possible.

To this there was then added 5 parts by weight of "Acrysol" ASE–75, which contained 40% polymer solids, which has been previously diluted with 15 parts by weight of water. The pH of the mixture was then quickly adjusted to 6.0. (It should be noted that it is important that at no time that the pH of the mixture containing the "Acrysol" go above about 7, since this will cause the "Acrysol" to swell, and in these relatively concentrated compositions will lead to serious handling difficulties.) The resulting product was a white, opaque, fluid or low viscosity, which showed only a slight increase in viscosity on standing for a week. This composition contained 11.25% by weight of $SiO_2$ and 2.5% by weight of the organic polymer. It was suitable for dilution to a silica concentration of 3%, and thereafter, upon the addition of ammonia to give a pH of 9, furnished a viscous, relatively clear coating solution, which gave thin, adherent silica coatings on metal.

*Example 8*

This is an example of a dilute mixture of colloidal silica, having particles 15 millimicrons in diameter, mixed with sufficient ammonium alginate to give a dilute coating solution. One hundred parts by weight of "Ludox" HS colloidal silica containing 30% $SiO_2$, 15 millimicron particles, was diluted with 300 parts by weight of water. Separately, 5 grams of alginic acid was suspended in 100 parts by weight of water and while hot, was neutralized with concentrated ammonium hydroxide to give a very viscous solution. This was then added with good agitation to the diluted silica sol to give a total of slightly over 500 parts by weight of a mixture containing 6% by weight of $SiO_2$ and 1% by weight of alginic acid in the form of its ammonium salt. This solution was fluid when warm, but fairly viscous when cold. It gave continuous smooth coating when applied in thin layers to steel and baked at 100° C.

Compositions similar to the above, suitable for the application of silica coatings, may also be made with a variety of other carboxylic acid polymers, in the form of their ammonium salts. For example, a copolymer of methyl vinyl ether and maleic anhydride may be employed. This material may be dissolved in an aqueous solution of dilute ammonia. A copolymer of polyvinylacetate with crotonic acid is another example, of a carboxylic acid polymer which is satisfactory, especially if the original polymer contains about 5% by weight of crotonic acid based on total polymer dry weight. (It should be added that, in the case of the methyl vinyl ether/maleic anhydride copolymer, the two components are present in about 50:50 proportions.)

This application is a continuation in part of our copending application Serial No. 646,560, filed March 18, 1957, now abandoned.

We claim:

1. A coating composition comprising an aqueous dispersion in which water is the only continuous phase and there is present (a) a dispersed organic film-former which is a carboxylic, polyanionic polymer containing a sufficient proportion of carboxyl groups that the ammonia salt of the polymer is at least 1% by weight soluble in water at 25° C. and pH 6.5, the polymer being removable without carbonization by heating at a temperature below 700° F. and being one which dries to a solid, and (b) colloidally dispersed, non-reticulated silica particles having an average size of 3 to 150 millimicrons, the concentration of silica in the aqueous dispersion being from 1 to 50% by weight, the total solids content of the coating composition being up to 70% by weight, and the initial proportion of removable film-former being from 5% to 100% by weight, based on the weight of silica.

2. A composition of claim 1 in which the organic film-former is a cross-linked, emulsion copolymer of acrylic acid and methyl acrylate having the following characteristics:

Percent solids _____ 28±0.5%.
pH _____ 3.5.
Viscosity of aqueous solution of 5%
  ammonium salt at pH 8  25,000 cp. (approx.)
Viscosity of aqueous solution of 1%
  ammonium salt at pH 8,  3,000 cp. (approx.)

3. A composition of claim 1 wherein the polyanionic polymer is present as the free carboxylic acid.

4. A composition of claim 1 wherein the polyanionic polymer is present as the free acid and is in the form of dispersed particles.

5. A composition of claim 1 wherein the polyanionic polymer is present as the free carboxylic acid and is in the form of dispersed particles, and the combined weight of polymer and silica is about from 10% to 70% by weight of the composition.

6. A composition of claim 1 in which the initial proportion of removable film-former is about 15% to 30% by weight based on the weight of the silica, and the combined weight of polymer and silica is about 20% to 40% by weight of the composition.

7. In a process for forming an adherent silica coating on a metal the steps comprising coating the metal with an aqueous dispersion in which water is the only continuous phase, the dispersion comprising (a) as dispersed organic film-former which is a carboxylic, polyanionic polymer containing a sufficient proportion of carboxyl groups that the ammonium salt of the polymer is at least 1% by weight soluble in water at 25° C. and pH 6.5, the polymer being removable without carbonization by heating at a temperature below 700° F., and being one which dries to a solid and (b) colloidally dispersed, non-reticulated, amorphous silica particles having an average size of 3 to 150 millimicrons, the concentration of silica in the dispersion being from 1 to 50% by weight, the total total solids content of the dispersion being up to 70% by weight, and the initial proportion of removable film-former being about 5% to 100% by weight based on the weight of silica, drying the coating, and heating the coating at a temperature above that at which the film-former is removed and below the melting point of the metal.

8. A process of claim 7 in which the organic film-former of the aqueous dispersion coating composition is a cross-linked, emulsion copolymer of acrylic acid and methyl acrylate having the following characteristics:

Percent solids _____ 28±0.5
pH _____ 3.5
Viscosity of aqueous solution of 5%
  ammonium salt at pH 8 _____ 25,000 (approx.)
Viscosity of aqueous solution of 1%
  ammonium salt at pH 8 _____ 3,000 (approx.)

9. An article comprising copper having upon its surface a strongly adherent, coalesced, continuous coating of silica particles, said article being produced by a process comprising the steps of coating the copper with an aqueous dispersion, in which water is the only continuous phase, the dispersion comprising (a) a dispersed organic film former which is a carboxylic, polyanionic polymer containing a sufficient proportion of carboxyl groups that the ammonium salt of the polymer is at least 1% by weight soluble in water at 25° C. and pH 6.5, the polymer being removable without carbonization by heating at a temperature below 700° F., and being one which dries to a solid, and (b) colloidally dispersed, non-reticulated, amorphous silica particles having an average size of 3 to 150 millimicrons, the concentration of silica in the dispersion being from 1 to 50% by weight, the total solids content of the dispersion being up to 70% by weight, and the initial proportion of removable film former being about 5% to 100% by weight based on the weight of silica, drying the coating, and heating the coating at a temperature above that at which the film former is removed and below the melting point of the copper.

10. An article comprising aluminum having upon its surface a strongly adherent, coalesced, continuous coating of silica particles, said article being produced by a process comprising the steps of coating the aluminum with an aqueous dispersion, in which water is the only continuous phase, the dispersion comprising (a) a dispersed organic film former which is a carboxylic, polyanionic polymer containing a sufficient proportion of carboxyl groups that the ammonium salt of the polymer is at least 1% by weight soluble in water at 25° C. and pH 6.5, the polymer being removable without carbonization by heating at a temperature below 700° F. and being one which dries to a solid, and (b) colloidally dispersed, non-reticulated, amorphous silica particles having an average size of 3 to 150 millimicrons, the concentration of silica in the dispersion being from 1 to 50% by weight, the total solids content of the dispersion being up to 70% by weight, and the initial proportion of removable film former being about 5% to 100% by weight based on the weight of silica, drying the coating, and heating the coating at a temperature above that at which the film former is removed and below the melting point of the aluminum.

11. An article comprising steel having upon its surface a strongly adherent, coalesced, continuous coating of silica particles, said article being produced by a process comprising the steps of coating the steel with an aqueous dispersion, in which water is the only continuous phase, the dispersion comprising (a) a dispersed organic film former which is a carboxylic, polyanionic polymer containing a sufficient proportion of carboxyl groups that the ammonium salt of the polymer is at least 1% by weight soluble in water at 25° C. and pH 6.5, the polymer being removable without carbonization by heating at a temperature below 700° F., and being one which dries to a solid, and (b) colloidally dispersed, non-reticulated, amorphous silica particles having an average size of 3 to 150 millimicrons, the concentration of silica in the dispersion being from 1 to 50% by weight, the total solids content of the dispersion being up to 70% by weight, and the initial proportion of removable film former being about 5% to 100% by weight based on the weight of silica, drying the coating, and heating the coating at a temperature above that at which the film former is removed and below the melting point of the steel.

References Cited in the file of this patent
UNITED STATES PATENTS

| | | |
|---|---|---|
| 2,467,341 | Seymour | Apr. 12, 1949 |
| 2,628,175 | Henderson | Feb. 10, 1953 |
| 2,733,160 | Iler | Jan. 31, 1956 |
| 2,740,726 | Anderson | Apr. 3, 1956 |
| 2,787,968 | Luvisi | Apr. 9, 1957 |
| 2,857,355 | Iler | Oct. 21, 1958 |